April 5, 1932.　　　　E. J. HOFF　　　　1,852,414
CURRENT METER
Filed Jan. 28, 1929
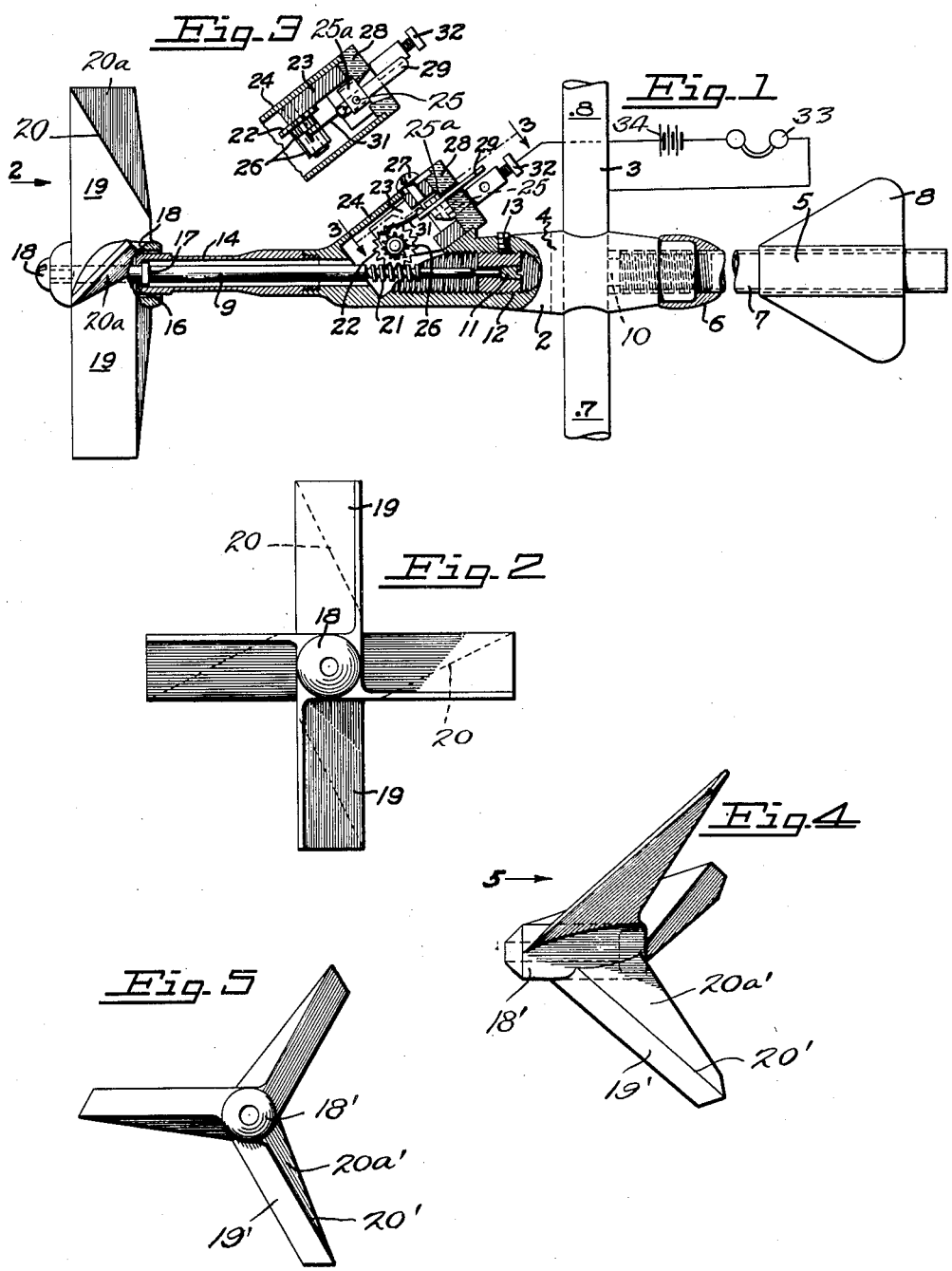
INVENTOR
EDWARD J. HOFF
BY Charles S. Evans
HIS ATTORNEY Patented Apr. 5, 1932

1,852,414

UNITED STATES PATENT OFFICE

EDWARD J. HOFF, OF BERKELEY, CALIFORNIA

CURRENT METER

Application filed January 28, 1929. Serial No. 335,416.

My invention relates to instruments for measuring current or flow of fluids, and particularly to such instruments adapted for gaging the flow of streams.

An object of my invention is to provide an instrument which will give reliable results under the widest possible range of conditions of use.

Another object of my invention is to provide a current meter which is not subject to damage by contact with the bottom of the stream or with floating or suspended objects.

Still another object of my invention is to provide a current meter with which accurate vertical integrations of stream flow can be made.

A further object of my invention is to provide a meter which will be unaffected by eddies or by components of stream flow which are not normal to the stream section thru which the flow is being measured.

My invention possesses other objects and valuable features, some of which will be set forth in the following description of my invention which is illustrated in the drawings forming part of the specification. It is to be understood that I do not limit myself to the showing made by the said description and drawings, as I may adopt varying forms of my invention within the scope of the claims.

Referring to the drawings:—

Figure 1 is a side elevation, partly in section, of the current meter of my invention, showing a propeller of the type preferred for measuring low velocities.

Figure 2 is a front elevation of the propeller shown in Fig. 1.

Figure 3 is a detail sectional view of the revolution counting mechanism, the plane of section being indicated by the line 3—3 of Fig. 1.

Figure 4 is a side elevation of a propeller adapted for use at high velocities.

Figure 5 is a front elevation of the propeller shown in Fig. 4.

The accurate measurement of stream velocities is an important and difficult problem. On such measurements are based the construction of hydro-electric plants and reclamation developments, as well as charges for water consumed for irrigation and other purposes.

A meter for performing this function must be reliable over the wide range of velocities which are frequently found in a single stream section, and, since it is a field instrument, subject to rough handling and accidents of use, it must be capable of maintaining this accuracy under adverse conditions.

Such meters comprise a propeller or runner which is rotated by the stream flow, and some means of indicating the number of revolutions made within a stated interval. Theoretically, they should offer no obstruction to the stream flow; actually, they rotate due to forces arising because they do offer obstruction to the flow, but in so far as is possible, this obstruction should be limited to the propeller, where it will produce useful work, and all forces tending to oppose the rotation of the propeller should be minimized.

The forces in response to which the propeller rotates are first, the velocity forces due to actual stream flow, and second, reactive forces, due to eddies or other disturbances of stream flow caused by the presence of the meter. The first are those which it is desired to measure, and are definite in amount. The second may be either additive or subtractive, are indefinite in amount, varying with turbulence and velocity of the stream, and are always possible sources of error. In addition to these forces, frictional resistance must be considered, which is always subtractive, and should always be reduced to the lowest possible value.

Stream lines in general are not parallel and perpendicular to the cross section of the stream, but have transverse components which must not be measured if the actual flow is to be obtained.

In the past it has been assumed that the meter which would respond to the lowest stream velocity was the best and most accurate. I have found, however, that the rotation of these meters at low velocities is due to the reactive forces involved, and that, since these are indefinite in value, meters of this character are subject to grave errors. Moreover, such meters will revolve due to the action of currents at right angles to those it is desired to measure, which involves an additional error. It is to the elimination of these errors, and to the production of a meter which will retain its calibration under the rigor of field service, that my invention is directed.

Broadly considered, the current meter of my invention comprises a propeller having blades whose surfaces are planes disposed at an angle to the axis of rotation. The propeller is resiliently flexible, preferably being made of rubber, so that accidental blows will not produce a permanent deformation. Moreover, since the rubber is of substantially the same density as water, practically all radial stress is removed from the bearings when the meter is in use, thus reducing friction, and largely eliminating errors due to inertia. Means are provided for indicating the revolutions of the propeller, the indicator preferably being adjustable to give an indication upon the completion of a selected predetermined number of revolutions.

In more detailed terms, the meter of my invention comprises a slender stream-lined body 2, the rear end of which is drilled vertically to provide a means of mounting the meter on a sounding rod 3, and is also provided with a vertically disposed slot 4 to receive a cable attachment bar where a cable mounting is preferred.

The rear end of the body is also provided with a longitudinal or horizontal thread into which is screwed the rudder or tail 5, which serves to clamp the meter to the sounding rod, by means of the lug 10, and forms an extension of the body helping to stabilize the meter in the stream. A ferrule 6 on the tail embraces the end of the body and keeps the slot 4 from spreading and loosening the threads.

The rudder comprises a horizontal tube or float 7 of aluminum or other light material, on which the vanes 8 are slidably mounted, the vanes being set at such a distance from the point of suspension that the meter will balance and hang horizontal when suspended in still water. Where cable suspension is used, the rudder should project from four to six times as far behind the support rod as the body proper projects ahead, in order to counteract the tendency of the meter to oscillate under the forces which tend to cause any obstruction in a stream to set itself normal to the direction of flow. This is not essential when the meter is rigidly mounted on a rod.

The body is bored longitudinally to receive the propeller shaft 9, which is preferably of Monel metal or other corrosion resistant material, and is rounded at its rear end where it rests against a flat step-bearing or pivot screw 11, tightly threaded into a bushing 12 which is itself threaded into the body 2 and locked in adjustment by a set screw 13.

Threaded onto the front end of the body is an elongated cap 14, which has an opening or bearing 16 in its forward end of such size as to fit loosely over the projecting end of the propeller shaft. A collar 17 on the shaft prevents it from disengaging with the step-bearing, but it is to be noted that this front bearing in the cap is so adjusted that there is an appreciable play both radially and longitudinally.

The propeller fits over the projecting end of the shaft and is held thereon by a screw 18 threaded into the end of the shaft. The propeller is preferably of "semi-soft" rubber, which is resiliently flexible and yet is sufficiently stiff to spring back into form if its blades are distorted. It may therefore be struck by a floating object or against the bottom of the stream without permanent damage. Such a blow will permanently destroy the calibration of a metal runner, and one of the advantages of my device lies in its ability to absorb without damage shocks which would render the usual type useless.

The propeller comprises a cylindrical hub 18 projecting from which are the blades 19. These blades are characterized by being formed with plane surfaces set angularly with respect to the axis of rotation and to each other. The blades have a high aspect ratio, i. e., are long with respect to their width. The angles of their component planes are empirically determined. The rear surface is relieved along the line 20 to form plane surfaces 20—a to assist in diminishing the effect of cross currents, and backwash.

It is probably impossible, as a matter of pure theory, to design any screw in which the velocity and reaction forces due to velocities normal to the axis are completely balanced for all positions of the screw and for all velocities. I have found, however, that by using plane surfaces as here described, the planes being so disposed as to make entering and trailing edges and blade ends fairly sharp, it is possible to produce a screw which will not rotate when moved in its own plane even at the maximum velocities feasible in the vertical integration of a stream section. Blades so formed approximate a constant angle screw. With a helical or constant pitch screw, motion in a plane normal to its axis will inevitably cause its rotation, owing to turbine action.

The sharp trailing edges and blade ends reduce the reaction forces. Such of these forces as exist are largely subtractive. They are greatest when the blade is at rest and fall rapidly in effect as the rotation increases with stream velocity. For this reason, my current meter will not rotate under as low velocities as will some other types, but it will reach the straight line portion of its rating curve sooner than these types, and its readings under minimum velocity and turbulent water conditions are more reliable.

Two types of propeller are shown. The four-bladed type, with straight blades, shown in Figs. 1 and 2, is more sensitive, and is to be preferred at low velocities. Its readings may be relied upon at the lowest velocities. The second type is shown in Figs. 4 and 5, and has backwardly sweeping blades which clear themselves more readily of weed or other floating material, and are of a more advantageous shape in resisting the pressure of high velocities. At highest velocities, this propeller will follow the same calibration curve as that of the four-blade runner, but it is not as sensitive to weak currents. The design of this propeller is based upon the same principles as that of the four-blade, and the parts are indicated in the drawings by similar reference characters.

Means are provided for counting the propeller revolutions. A worm 21 is formed on the shaft 9. This meshes with a worm wheel 22, pivotally mounted on a block 23 which fits within a side opening of thimble 24 formed in the body 6. Integral with the worm wheel are a plurality of contactor elements 26, all of which are of the same diameter, but which have different numbers of contact points or teeth.

The block 23 is held in the thimble by the screw 27, and to the end of the block is secured an insulating cap 28 thru which extends the small lever 29. The inner end of the lever carries a light contact wire 31, which may be brought into engagement with any desired one of the contactor elements by moving the lever about the pin 25, which is secured in the block 25—a attached to the binding post 32. It is convenient to use a worm wheel having twenty teeth, and contactor elements having ten, four and two teeth respectively, so that by adjusting the lever the meter may be made to indicate every two, five or ten revolutions.

A binding post 32 connects with the lever, and the revolutions may be read by connecting a telephone 33 and a small battery 34 to this post, the circuit being completed thru the body of the meter and the sounding rod 7. A click may be heard in the telephone every time one of the points on the contact elements strikes the wire 31, and by counting these clicks over a given period the velocity of the current may quickly be computed. For weak stream currents, the contactor is arranged to indicate every two revolutions. For rapid currents this would cause the clicks to come too rapidly for accurate counting, and the lever would accordingly be swung to engage the two-point contactor element, giving a click every ten revolutions. Reliable readings may thus be obtained over a wide range of stream velocities.

It is to be noted that no attempt is made to keep water out of the meter, all stuffing boxes and similar devices having been dispensed with. The front bearing in particular is very loose. Since the density of the propeller is approximately the same as that of water (Sp. G. 1.3), there is very little load on the bearing, and the water entering it forms a very satisfactory cushion or lubricant. If the current to be measured is silty or has a heavy saline content, the contactor may be removed and the meter filled with pure water before use, which will prevent the entrance of the damaging impurities.

The meter thus described is small and is streamlined, offers little opposition to stream flow, and is easily carried and manipulated. It does not rotate in response to currents perpendicular to its axis of rotation and therefore may be moved vertically and horizontally to integrate velocities over the stream section without introducing errors. As a corollary of this fact, it approximates the cosine law quite closely, giving readings in eddies or cross currents which correspond closely to actual stream flow. Its friction losses and inertia effects are minimal, owing to the runner being of substantially the same density as water. Finally, since reaction forces affect it subtractively and decrease with velocity, it does not overrate weak currents, and gives accurate and reproducible readings on currents of approximately half the value of the best previous types.

I claim:

1. In a current meter, a propeller having blades consisting of soft rubber.

2. In a current meter, a propeller comprising a hub, and a plurality of blades radially disposed about said hub and fixed thereto, the leading edge of each of said blades being of substantially uniform thickness and the rear edge of each blade increasing from a thickness at the outer end of the blade approximately equal to the thickness of the leading edge to a thickness materially greater than that of the leading edge adjacent the hub.

3. In a current meter, a propeller comprising a hub, and a plurality of resiliently flexible blades radially disposed about said hub and fixed thereto, the leading edge of each of said blades being of substantially uniform thickness and the rear edge of each blade increasing from a thickness at the outer end of the blade approximately equal to the thickness of the leading edge to a thickness materially greater than that of the leading edge adjacent the hub.

4. In a current meter, a propeller comprising a hub, and a plurality of blades radially disposed about said hub and fixed thereto, the front surface of each blade being bounded by a plane inclined at an angle to the axis of rotation of said propeller, and the rear surface of each blade being bounded by two planes at angles to each other and to the front surface so that the leading edge of each of said blades is of a substantially uniform thickness and the rear edge of each blade increases from a thickness at the outer end of the blade approximately equal to the thickness of the leading edge to a thickness materially greater than that of the leading edge adjacent the hub.

5. In a current meter, a propeller comprising a hub, and a plurality of blades radially disposed about said hub and fixed thereto, the leading and trailing edges of each of said blades being of substantially uniform thickness, and the intermediate portions of each blade increasing from a thickness at the outer end of the blade approximately equal to that of the leading and trailing edges to a thickness adjacent the hub materially greater than that of said edges.

6. In a current meter, a propeller comprising a hub, and a plurality of blades disposed about said hub and fixed thereto and projecting radially and rearwardly therefrom, each blade comprising a plurality of plane surfaces, the leading and trailing surfaces of each blade being bounded by two planes so that a transverse section through the blade is of trapezoidal outline.

7. In a current meter, a propeller comprising a hub, and a plurality of blades disposed about said hub and fixed thereto and projecting radially and rearwardly therefrom, each blade comprising a plurality of plane surfaces, the leading and trailing surfaces of each blade being bounded by two planes so that a transverse section through the blade is of trapezoidal outline, and the front and rear edges of each blade converging outwardly from the hub so that each blade tapers toward the outer end thereof.

8. In a current meter, a propeller comprising a hub, and a plurality of resiliently flexible blades disposed about said hub and fixed thereto and projecting radially and rearwardly therefrom, each blade comprising a plurality of plane surfaces, the leading and trailing surfaces of each blade being bounded by two planes so that a transverse section through the blade is of trapezoidal outline.

In testimony whereof, I have hereunto set my hand.

EDWARD J. HOFF.